United States Patent [19]
Olson

[11] 3,792,237
[45] Feb. 12, 1974

[54] EMBOSSED CARD ORIENTATION DEVICE

[75] Inventor: Gust A. Olson, Los Angeles, Calif.

[73] Assignee: Rockwell International Corporation, El Segundo, Calif.

[22] Filed: Dec. 13, 1971

[21] Appl. No.: 207,093

[52] U.S. Cl. ............... 235/61.11 R, 235/61.11 B, 235/61.11 C, 340/149 A
[51] Int. Cl. G06k 7/015, G06k 19/06, G06k 13/06
[58] Field of Search 235/61.11 R, 61.11 B, 61.11 C, 235/61.11 A, 61.12 R, 61.12 N, 61.7 B; 340/149 A; 200/46; 101/47; 40/142 R, 64 R, 142 A; 308/3 R, 3 A

[56] References Cited
UNITED STATES PATENTS

| | | | |
|---|---|---|---|
| 3,498,685 | 3/1970 | Poplinski | 308/3 R |
| 387,514 | 8/1888 | Heslin | 308/3 A |
| 1,296,744 | 3/1919 | Blood | 308/3 A |
| 791,903 | 6/1905 | Hawkins | 40/142 R |
| 3,612,832 | 10/1971 | Goldstein | 235/61.11 E |
| 3,612,833 | 10/1971 | Davis | 235/61.11 C |
| 3,048,097 | 8/1962 | Miller | 101/47 |

*Primary Examiner*—Daryl W. Cook
*Assistant Examiner*—Robert M. Kilgore
*Attorney, Agent, or Firm*—G. Donald Weber, Jr.; H. Frederick Hamann; L. Lee Humphries

[57] ABSTRACT

This invention discloses a device for orienting credit cards insuring the embossed account numbers of the credit card will be entering the character scanning apparatus in correct attitude. The orientation device has a top member with a substantially flat surface formed with an accurately dimensioned groove to receive a row of embossed characters on a credit card. The raised portion of the groove tapers at an angle of about ten degrees to the top surface permitting easy lateral sliding of the character row substantially free of interference with adjacent character rows of the credit card.

3 Claims, 3 Drawing Figures

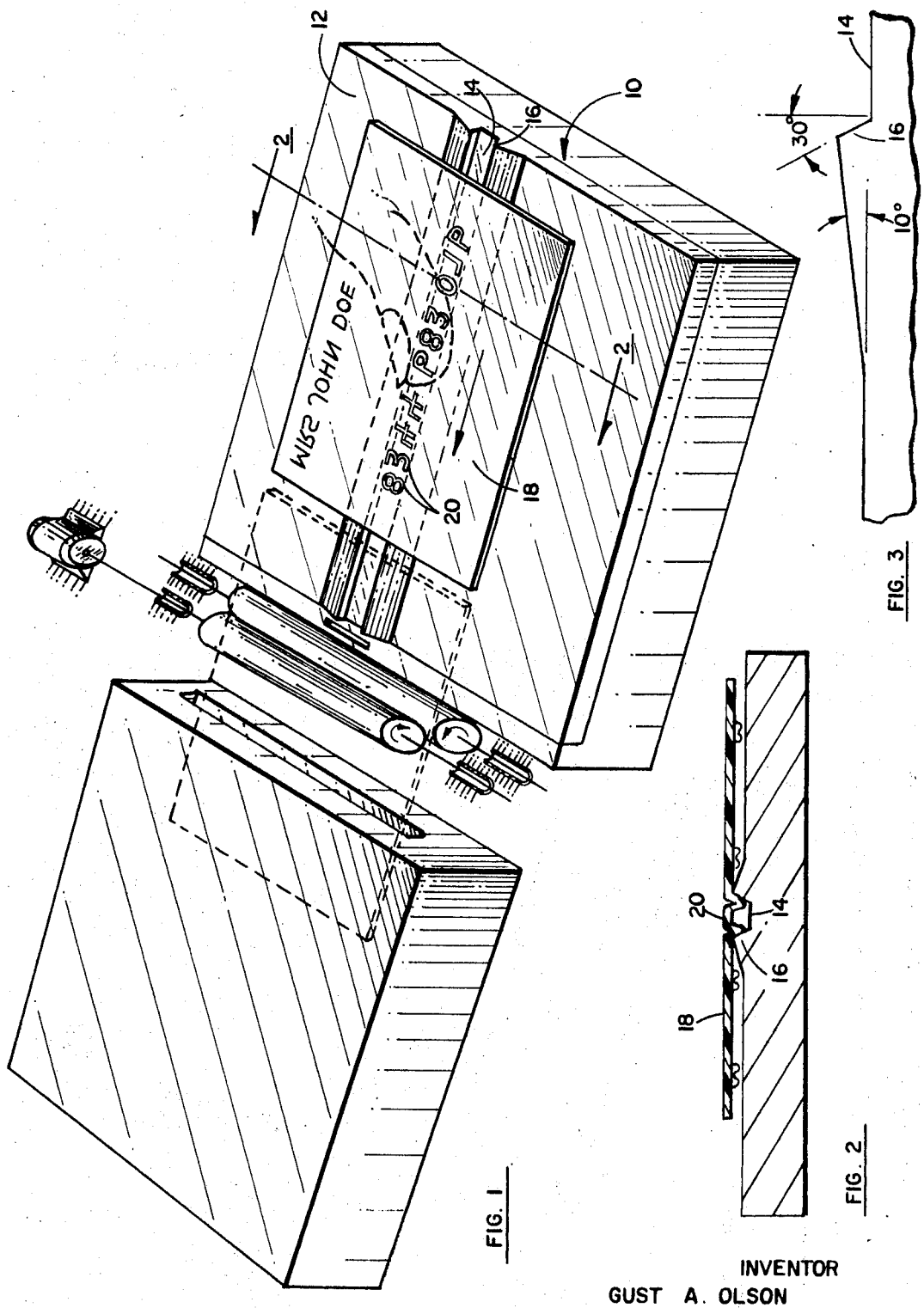

3,792,237

EMBOSSED CARD ORIENTATION DEVICE

BACKGROUND OF THE INVENTION

1. Field of the Invention

This invention relates to a device for use with a credit card, and more particularly to a device which can orient an embossed credit card to insure that the embossed account numbers of the credit card are properly received by the character scanning apparatus.

2. Description of Prior Art

The current trend among oil companies, mercantile establishments and in particular department stores and restaurants is to transact business by means of a credit card. As a result of this increase in the use of credit cards, many devices have been designed to rapidly store, compare or verify character groups that represent a particular account number.

Presently, this involves a variety of pattern recognition devices such that read embossed characters of a credit card by electro-optical arrangements that convert the characters into electrical signals.

The conventional credit card positioners or holders consist mostly of slots wherein the cards are inserted into printing position. The prime disadvantage of this type of holder is that the card stock thicknesses varies which frequently results in damaging the cards and rejecting bent cards.

Another disadvantage of the conventional holders utilizing slots or grooves for guiding the embossed characters is the inability of handling closely spaced embossed character rows without seriously affecting the life of the card.

SUMMARY OF THE INVENTION

It is the primary object of this invention to provide a relatively simple and economical apparatus for properly orienting credit cards entering embossed character scanning instrumentalities.

Another object of this invention is to provide a device of the above type which is self-contained and portable.

Still another object of this invention is to provide the operator with a rapid accurate means of positioning credit cards regardless of card stock thickness and with relative insensitivity to embossed character height and proximity of lines of other embossed character rows.

Still another object of this invention is to provide an orienting device that will accept credit cards with the raised embossed portion of the characters facing downward.

These and other objects are accomplished by an orientation device having a relatively hard material with a flat top surface formed with an accurately dimensioned groove to receive a row of embossed account characters on a credit card. The raised portions of the groove taper at an angle of about ten degrees to the top surface permitting easy lateral sliding of the embossed account row substantially free of interference with adjacent character rows of the credit card.

Other objects and advantages of this invention will be apparent from the following detailed description wherein a preferred embodiment of the present invention is clearly shown.

IN THE DRAWINGS

FIG. 1 is a schematic perspective of the orientation device in combination with a scanning apparatus.

FIG. 2 is a cross-section taken along lines 2—2 of FIG. 1.

FIG. 3 is an enlarged end view of the raised portion and taper.

BRIEF DESCRIPTION OF THE DRAWINGS

This invention relates to a device for orienting credit cards insuring that the embossed account numbers of the credit cards will be entering the character scanning apparatus in correct attitude.

As illustrated in FIG. 1, the orienting device 10 has a rigid flat top surface 12 formed with a raised tapered portion 16 having an opening groove 14 extending across a portion of the top surface 12 that is accurately dimensioned to receive a row of embossed numbers 20 on a credit card 18. Each raised portion 16 of this groove tapers at an angle of about 5° to 20° to the top surface 12. The taper of the raised portion on the groove 14 is such that the credit cards having closely spaced embossed lines can be used with substantially no wear of the adjacent embossed characters.

The taper of the raised portion is critical if greater than fifteen degrees because the credit card 18 is not permitted the support of the adjacent area to the groove 14 thereby depriving the user of being relatively casual in balancing the credit card 18 once it is in the orienting groove 14. If the angle of the taper is less than five degrees, the credit card cannot move transversely into the tracking groove without affecting the life of the adjacent characters as a result of the contact with the top surface 12 and also would preclude the proper guidance of the characters in groove 14, as illustrated in FIG. 2. The taper of the inside walls of the groove varies from 20° to 40° to the bottom of the groove, as illustrated in FIG. 3. The taper allows sufficient clearance for the embossed account character row 20 to track smoothly without significant side wearing of the character.

The material should be hard and abrasive resistant such as metal or relatively rigid plastic that lends itself to be made smooth in areas of contact with the credit card 18.

Adjacent rows of information normally consist of substantially smaller characters than the account characters. This feature allows the operator to rapidly select the row of characters to be registered.

The operator places the credit card 18 face down positioning the raised embossed account character row 20 in the groove 14 sliding the card 18 into the scanning mechanism. The groove 14 insures the embossed characters 20 will be properly oriented when entering the character scanning device.

This invention provides the operator with a rapid but accurate means of positioning the credit card 18 regardless of the card stock thickness demonstrating relative insensitivity to embossed character height and proximity of adjacent embossed character rows.

The device is portable and can be attached to scanning apparatuses such as pattern readers.

While a specific embodiment of the invention has been shown and described in detail to illustrate the application of the inventive principles involved, it is to be

I claim:

1. A device for guiding an embossed card into a character scanning apparatus and insuring the embossed characters of the embossed card will enter said character scanning apparatus in proper orientation for registration of said characters, said device comprising:
   a relatively rigid member having a substantially smooth flat surface,
   a tapered raised portion on said surface extending across a section of said surface wherein the upper surface of said tapered, raised portion is narrower than the lower surface thereof,
   the taper angle of the sides of said tapered, raised portion is between 5° and 20° relative to said surface of said member to permit an embossed card to be readily moved across said surface and up the tapered sides of said tapered, raised portion transverse to the extension of said tapered, raised portion,
   said tapered, raised portion to receive and limit the lateral movement of said embossed characters on said embossed card, and
   said groove being wider at the top than at the bottom thereof and having inside walls which taper between 20° 40° relative to said surface.

2. The device recited in claim 1 wherein said groove defines a specified width which is related to a particular segment of the embossed characters on said embossed card wherein the particular segment is accepted by said groove to operate as a registration index for said embossed card.

3. The device recited in claim 1 wherein said character scanning apparatus has a preferred character scanning orientation, and
   said member is so coupled to said character scanning apparatus that said groove supplies an embossed card to said character scanning apparatus in accordance with said preferred character scanning orientation.

* * * * *